(12) United States Patent
Ueta et al.

(10) Patent No.: US 7,795,767 B2
(45) Date of Patent: Sep. 14, 2010

(54) MOTOR WITH MULTIPLE BUS RINGS

(75) Inventors: Tetsuji Ueta, Hirakata (JP); Hiroaki Sagara, Kasai (JP); Yukifumi Yamaguchi, Himeji (JP); Takashi Uchino, Hirakata (JP); Kenji Taguchi, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 9 days.

(21) Appl. No.: 12/401,834

(22) Filed: Mar. 11, 2009

(65) Prior Publication Data

US 2009/0243408 A1 Oct. 1, 2009

(30) Foreign Application Priority Data

Mar. 28, 2008 (JP) ............................. 2008-088264

(51) Int. Cl.
*H02K 11/00* (2006.01)
(52) U.S. Cl. ........................................ 310/71; 310/194
(58) Field of Classification Search ................... 310/43, 310/71, 179–184, 194, 254.1
See application file for complete search history.

(56) References Cited

U.S. PATENT DOCUMENTS

| | | | |
|---|---|---|---|
| 6,856,057 B2* | 2/2005 | Kobayashi et al. | 310/71 |
| 6,894,410 B2* | 5/2005 | Kobayashi et al. | 310/71 |
| 6,930,418 B2* | 8/2005 | Kobayashi et al. | 310/71 |
| 6,993,829 B2* | 2/2006 | Kobayashi et al. | 29/622 |
| 7,374,462 B2* | 5/2008 | Kobayashi | 439/723 |
| 7,545,063 B2* | 6/2009 | Yoshida et al. | 310/71 |
| 2006/0208584 A1* | 9/2006 | Kirkman et al. | 310/71 |
| 2007/0052307 A1* | 3/2007 | Yoshida et al. | 310/71 |
| 2007/0278875 A1* | 12/2007 | Haga et al. | 310/71 |
| 2007/0278876 A1* | 12/2007 | Haga et al. | 310/71 |

FOREIGN PATENT DOCUMENTS

JP 2003-134726 A 5/2003

* cited by examiner

*Primary Examiner*—Thanh Lam
(74) *Attorney, Agent, or Firm*—Marvin A. Motsenbocker; Mots Law, PLLC (57) ABSTRACT

An aspect of the invention provides a motor that comprises: a stator including multiple motor coils; multiple bus rings configured to distribute currents of different phases to the motor coils; and a ring-shaped bus ring holder in which multiple holding grooves configured to hold the respective bus rings are formed, wherein: each of the motor coils includes an insulator around which a wound wire is wound; the insulator includes an outer flange formed at an outer side of the wound wire in a radial direction of the motor and extending in an axial direction of the motor; and the bus ring holder is arranged at an outer side of the outer flange in the radial direction of the motor, and contiguous to the outer flange.

9 Claims, 12 Drawing Sheets

MOTOR WITH MULTIPLE BUS RINGS

CROSS REFERENCE TO RELATED APPLICATIONS

This application claims priority based on 35 USC 119 from prior Japanese Patent Application No. P2008-088264 filed on Mar. 28, 2008, entitled "Motor with Multiple Bus Rings", the entire contents of which are incorporated herein by reference.

BACKGROUND OF THE INVENTION

1. Field of the Invention

The invention relates to a motor including multiple bus rings respectively configured to distribute currents of multiple different phases.

2. Description of Related Art

Motors have been widely used heretofore that include a stator including multiple motor coils and multiple bus rings configured to distribute currents of different phases to the motor coils. Each of the motor coils includes an insulator around which a wound wire is wound. A motor core constituting a frame of the stator is provided at an outer side of the insulator in its radial direction.

For such a motor, proposed is a configuration which includes a ring-shaped bus ring holder (see Japanese Patent Application Publication No. 2003-134726, FIG. 1, for instance). Specifically, multiple holding grooves for holding the respective bus rings are formed in the bus ring holder. In a motor described in Japanese Patent Application Publication No. 2003-134726, the bus ring holder is arranged adjacent to the motor coils in an axial direction of the motor.

However, the motor described in Japanese Patent Application Publication No. 2003-134726 has the following problem. Specifically, the problem is that, as the bus ring holder is arranged adjacent to the motor coils in the axial direction of the motor, the size of the motor in the axial direction has to be large enough to accommodate the bus ring holder.

Arranging the bus ring holder outside the motor core in the radial direction can be considered to make the motor small in size in the axial direction. However, this configuration requires the size of the motor in the radial direction to be large enough to accommodate the bus ring holder.

SUMMARY OF THE INVENTION

An aspect of the invention provides a motor that comprises: a stator including multiple motor coils; multiple bus rings configured to distribute currents of multiple different phases to the motor coils; and a ring-shaped bus ring holder in which multiple holding grooves configured to hold the respective bus rings are formed, wherein: each of the motor coils includes an insulator around which a wound wire is wound; the insulator includes an outer flange formed at an outer side of the wound wire in a radial direction of the motor, and extending in an axial direction of the motor; and the bus ring holder is arranged at an outer side of the outer flange in the radial direction of the motor, and contiguous to the outer flange.

In this motor, the bus ring holder is arranged outward of the outer flanges of the insulators in the radial direction of the motor, and contiguous to the outer flanges. This arrangement makes the motor smaller in size in the axial direction than a motor having the bus ring holder arranged adjacent to the motor coils in the axial direction of the motor. In addition, this arrangement makes the motor smaller in size in the radial direction than a motor having the bus ring holder arranged outward of the motor cores in the radial direction of the motor.

Consequently, this aspect of the invention provides a motor that is configured by including the ring-shaped bus ring holder configured to hold the bus rings, and whose size is smaller in both the axial direction and the radial direction.

It is preferred that each of the bus rings comprises: a ring-shaped part formed in a circumferential direction of the motor; a current supplying end part positioned at an outer side of the ring-shaped part in the radial direction of the motor and configured to supply one of the currents of different phases; and a folded part continuing to the current supplying end part and the ring-shaped part, and folded along an axial direction of the motor.

The above-described motor can be reduced in size in the axial and the radial directions by including the ring-shaped bus ring holder configured to hold the bus rings.

Another aspect of the invention provides a motor that comprises: motor coils comprising: a plurality of U-phase coils configured to distribute a U-phase current; a plurality of V-phase coils configured to distribute a V-phase current; and a plurality of W-phase coils configured to distribute a W-phase current, a plurality of bus rings configured to distribute currents of different phases to the motor coils; and a ring-shaped bus ring holder having holding grooves configured to hold the bus rings, wherein each U-phase, V-phase and W-phase coil includes an insulator around which a wound wire is wound, the insulator includes an outer flange that is provided at an outer side of the wound wire in a radial direction of the motor, and which extends in an axial direction of the motor, and the bus ring holder is provided at an outer side of the outer flange in the radial direction of the motor, and is contiguous to the outer flange.

DETAILED DESCRIPTION OF EMBODIMENTS

Hereinafter, descriptions are provided for a motor according to embodiments of the invention by referring to the drawings. Specifically, descriptions are provided for (1) an overall schematic configuration of the motor, (2) configurations respectively of a stator and a bus ring holder, (3) detailed configurations respectively of the bus ring holder and an insulator, (4) a method of how teeth and a yoke are assembled together, (5) operation and effects, and (6) other embodiments.

In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

(1) Overall Schematic Configuration of Motor

Figure 1:
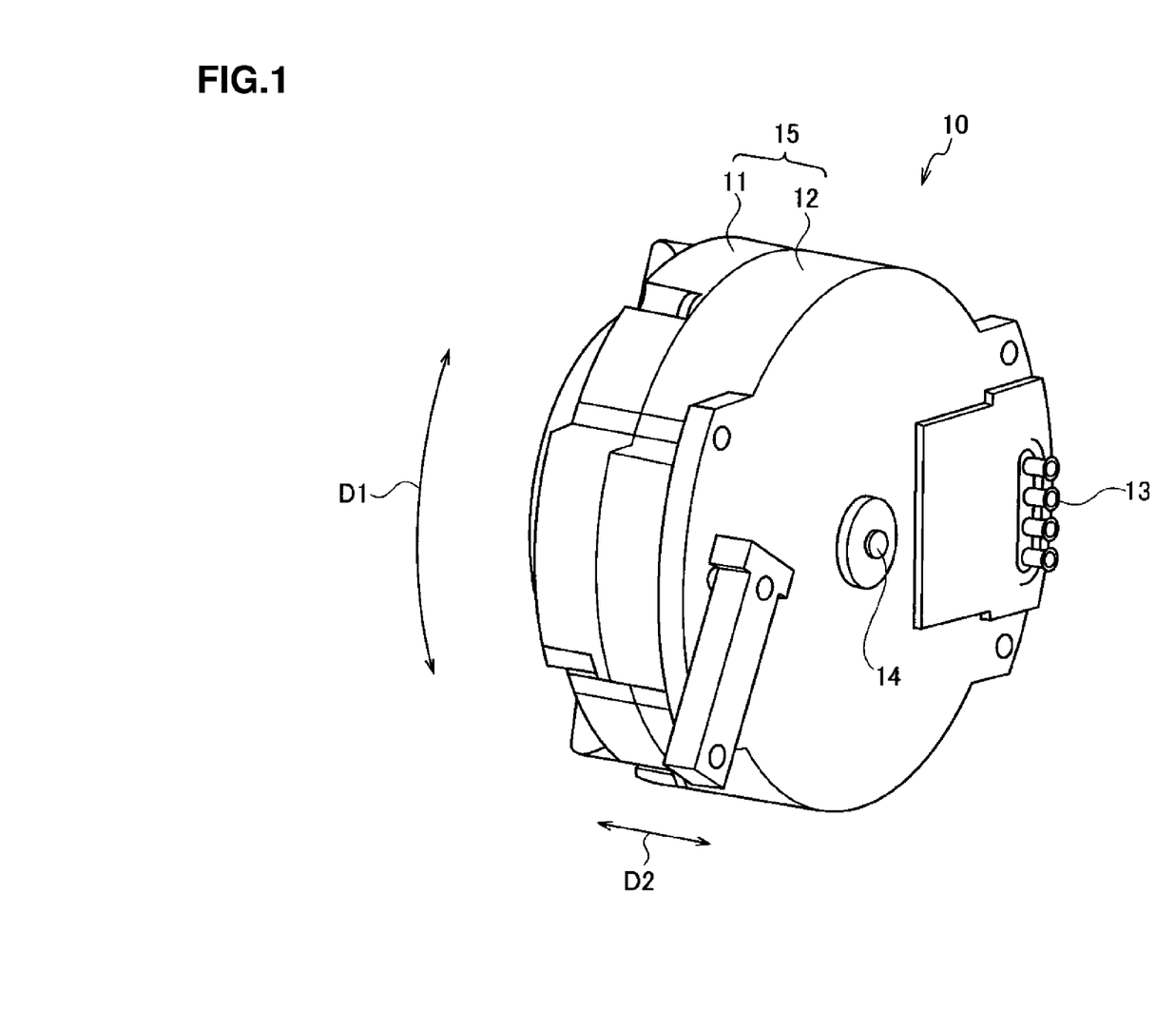
FIG. 1 is an external view of a motor according to an embodiment.

FIG. 1 is an external view of a three-phase brushless motor 10 that is a motor according to the embodiment. Three-phase brushless motor 10 is a three-phase inner rotor brushless motor arranged in the vicinity of a wheel of a motor vehicle. This type of three-phase brushless motor 10 is required to generate a driving force for driving a wheel, and concurrently to be compact in size.

As shown in FIG. 1, three-phase brushless motor 10 includes: case 15; shaft 14 inserted in case 15; and terminal part 13 to be attached to case 15.

Case 15 is shaped substantially like a cylinder. Case 15 includes case main body 12 and lid body 11. Lid body 11 is fastened to case main body 12 by use of bolts not shown. U-phase, V-phase and W-phase currents, voltages and the like whose phases are spaced equally, resulting in a phase separation of 120 degree, are input into terminal part 13.

Figure 2:
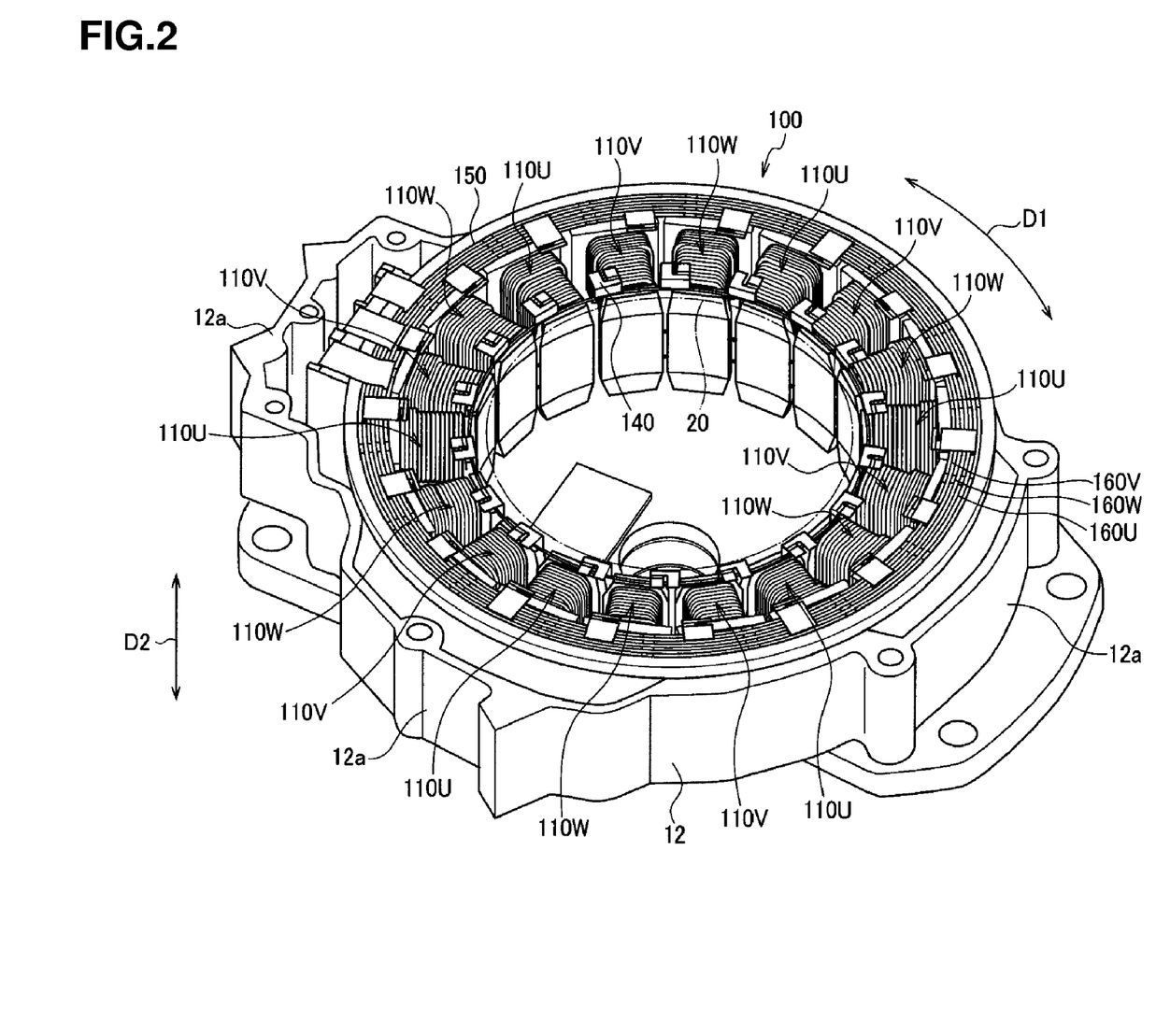
FIG. 2 is a perspective view showing an internal configuration of a case main body according to the embodiment.

FIG. 2 is a perspective view showing an internal configuration of case main body 12. As shown in FIG. 2, rotor 20 and stator 100 are arranged in case main body 12. Case main body 12 includes protruded parts 12a which protrude outward in the radial direction. Each protruded part 12a includes a fastening mechanism configured to fasten stator 100 and the like to case main body 12.

Stator 100 is arranged in the circumferential direction D1 so as to encompass the outer perimeter of rotor 20 in the radial direction. Stator 100 includes multiple motor coils 110U, multiple motor coils 110V, and multiple motor coils 110W.

Six motor coils 110U are each provided as a U-phase coil for the U phase. In addition, six motor coils 110V are each provided as a V-phase coil for the V phase, and six motor coils 110W are each provided as a W-phase coil for the W phase.

In this embodiment, a total of 18 motor coils 110U, 110V, 110W are arranged in the circumferential direction D1. Specifically, six sets each set including one motor coil 110U, one motor coil 110V and one motor coil 110W are formed.

Neutral bus ring 140 is arranged in radial inner end portions respectively of motor coils 110U, 110V, 110W. Neutral bus ring 140 is shaped like a ring, and is formed a metal sheet.

Ring-shaped bus ring holder 150 is arranged in radial outer end portions respectively of motor coils 110U, 110V, 110W. Bus ring holder 150 is made of an insulating material such as a resin, and is formed as a single component.

Bus ring holder 150 holds ring-shaped bus rings 160U, 160V, 160W for the three phases, respectively. Each of bus rings 160U, 160V, 160W is formed as a single component punched out from a metal sheet and subsequently bent in the thickness direction. Bus rings 160U, 160V, 160W are arranged sequentially in the radial direction.

Bus ring 160U distributes a U-phase current to motor coils 110U. Bus ring 160V distributes a V-phase current to motor coils 110V. Bus ring 160W distributes a W-phase current to motor coils 110W.

(2) Configurations of Stator and Bus Ring Holder

Figure 3:
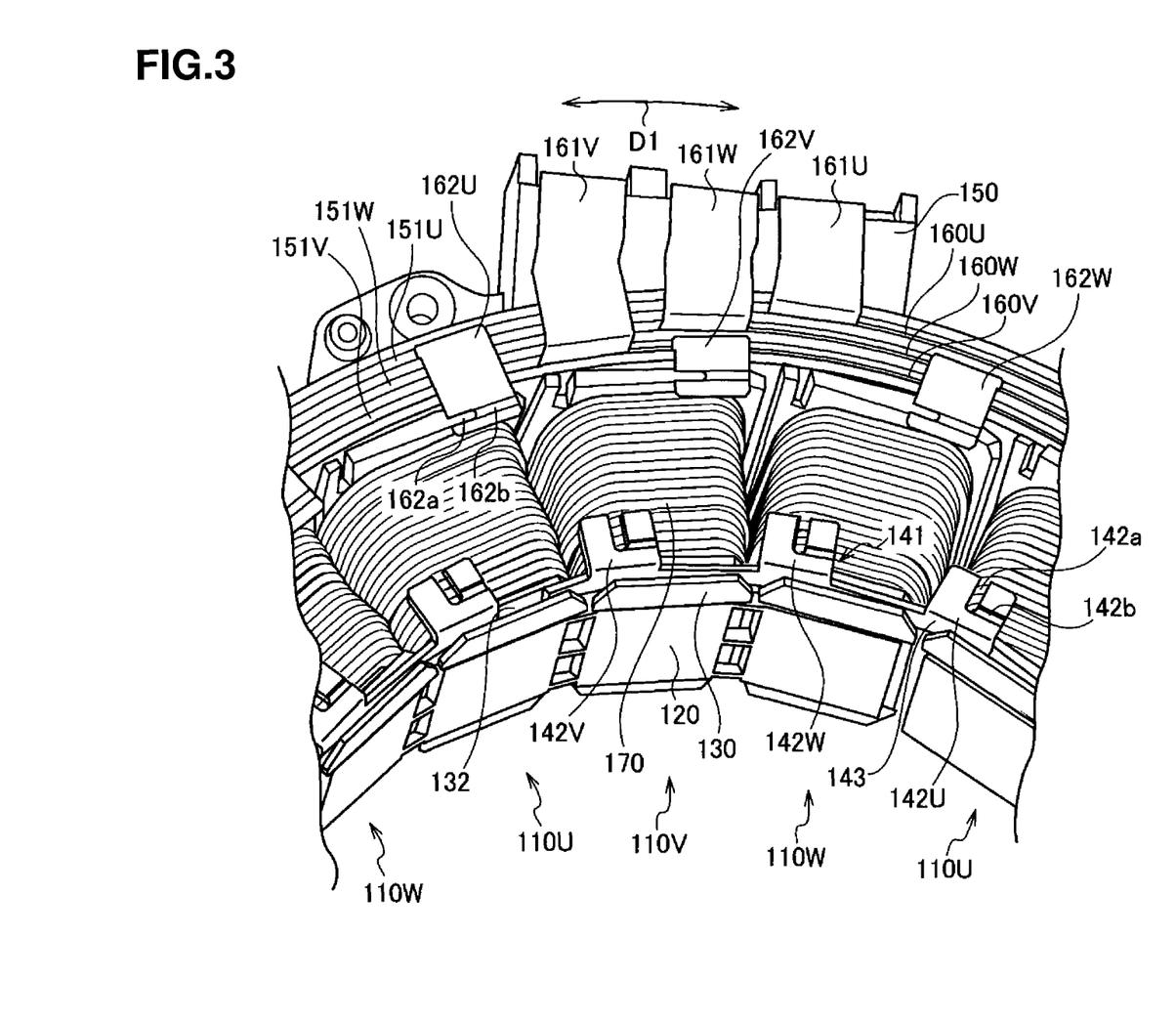
FIG. 3 is a partially-magnified perspective view of the internal configuration of the case main body shown in FIG. 2, which is viewed from the inside of the case main body in a radial direction of the motor.

FIG. 3 is a partially-magnified perspective view of the stator 100 shown in FIG. 2, which is viewed from the inside of the motor in the radial direction.

As shown in FIG. 3, each of motor coils 110U, 110V, 110W includes tooth 120, insulator 130 and wound wire 170.

Tooth 120 is made of a metal, and extends in the radial direction. Tooth 12 is inserted in an insertion hole formed in insulator 130.

Insulator 130 is made of an insulating material. Wound wire 170 is wound around insulator 130.

Neutral bus ring 140 is divided into multiple bus ring members 141. Each bus ring member 141 connects together three motor coils 110U, 110V, 110W which are arranged sequentially in the circumferential direction D1.

Each bus ring member 141 is held by corresponding grooves 132 respectively formed in insulators 130. Specifically, bus ring member 141 includes: inserted part 143 configured to be inserted in corresponding grooves 132; and three wound-wire connecting terminals 142U, 142V, 142W which extend from inserted part 143 outward in the radial direction. Cutout part 162a and concave part 162b are formed in each of wound-wire connecting terminals 142U, 142V, 142W.

Wound-wire connecting terminals 142U, 142V, 142W are provided in bus ring member 141 in such a way as to correspond to motor coils 110U, 110V, 110W, respectively. Wound wires 170 of motor coils 110U, 110V, 110W are soldered to wound-wire connecting terminals 142U, 142V, 142W, respectively.

Bus ring holder 150 is located outside insulator 130 in the radial direction. Multiple holding grooves 151U, 151V, 151W are formed in bus ring holder 150.

Bus ring 160U is inserted in holding groove 151U. Bus ring 160V is inserted in holding groove 151V. Bus ring 160W is inserted in holding groove 151W.

Furthermore, bus ring holder 150 holds current supplying end parts 161U, 161V, 161W configured to supply current to bus rings 160U, 160V, 160W.

Bus ring 160U includes wound-wire connecting terminals 162U which extend inward in the radial direction. Similarly, bus ring 160V includes wound-wire connecting terminals 162V, and bus ring 160W includes wound-wire connecting terminals 162W. Wound wires 170 are soldered to corresponding wound-wire connecting terminals 162U, 162V, 162W, respectively.

Specifically, each of wound-wire connecting terminals 162U, 162V, 162W includes cutout part 162a and concave part 162b. Cutout part 162a and concave 162b are formed in a straight line in the circumferential direction D1.

Figure 4:
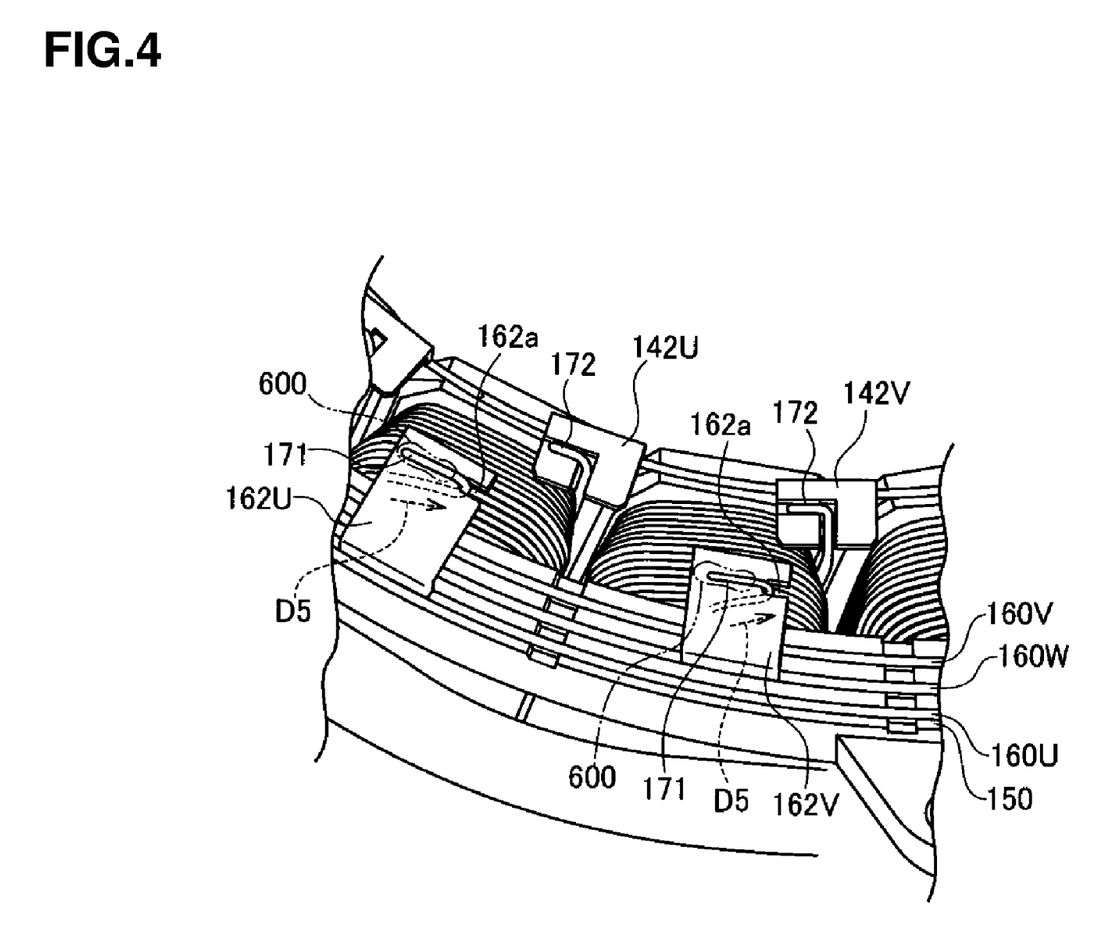
FIG. 4 is a partially-magnified perspective view of the internal configuration of the case main body shown in FIG. 2, which is viewed from the outside of the case main body in the radial direction of the motor.

FIG. 4 is a partially-magnified perspective view of stator 100 shown in FIG. 2, which is viewed from the outside of the motor in the radial direction. As shown in FIG. 4, end parts 171 of wound wires 170 is soldered to corresponding wound-wire connecting terminals 162U, 162V, 162W, respectively. In addition, end parts 172 of wound wires 170 are soldered to corresponding wound-wire connecting terminals 142U, 142V, 142W which are located close to the neutral point.

End part 172 of each wound wire 170 is a starting side at which the wound wire 170 begins to be wound around corresponding insulator 130, and end part 171 of each wound wire 170 is an ending side at which the wound wire 170 is wound around corresponding insulator 130. In addition, each wound wire 17 is wound around corresponding insulator 130 in a clockwise direction, when the insulator 130 is viewed from the outside of the motor in the radial direction.

Consequently, end parts 171 of wound wires 170 extend to corresponding wound-wire connecting terminals 162U, 162V, 162W from corresponding insulators 130 in a direction D5 in FIG. 4, respectively. With this taken into consideration, cutout part 162a is formed in an end portion of each of wound-wire connecting terminals 162U, 162V, 162W in the direction D5.

The width of each cutout part 162a in the radial direction is equal to, or larger than, the diameter of end part 171 of corresponding wound wire 170. End part 171 of each wound wire 170 is held by corresponding cutout part 162a.

Each concave part 162b is formed extending from cutout part 162a to an opposite end portion of any one of wound-wire connecting terminals 162U, 162V, 162W in the direction D5. Each concave part 162b shown in FIG. 3 is in contact with end part 171 of corresponding wound wire 170 held by corresponding cutout part 162a. End part 171 of each wound wire 170 is soldered to corresponding concave part 162b while contacting corresponding concave part 162. Specifically, end parts 171 of wound wires 170 are fixed to corresponding wound-wire connecting terminals 162U, 162V, 162W by a soldering member 600, respectively.

Figure 5:
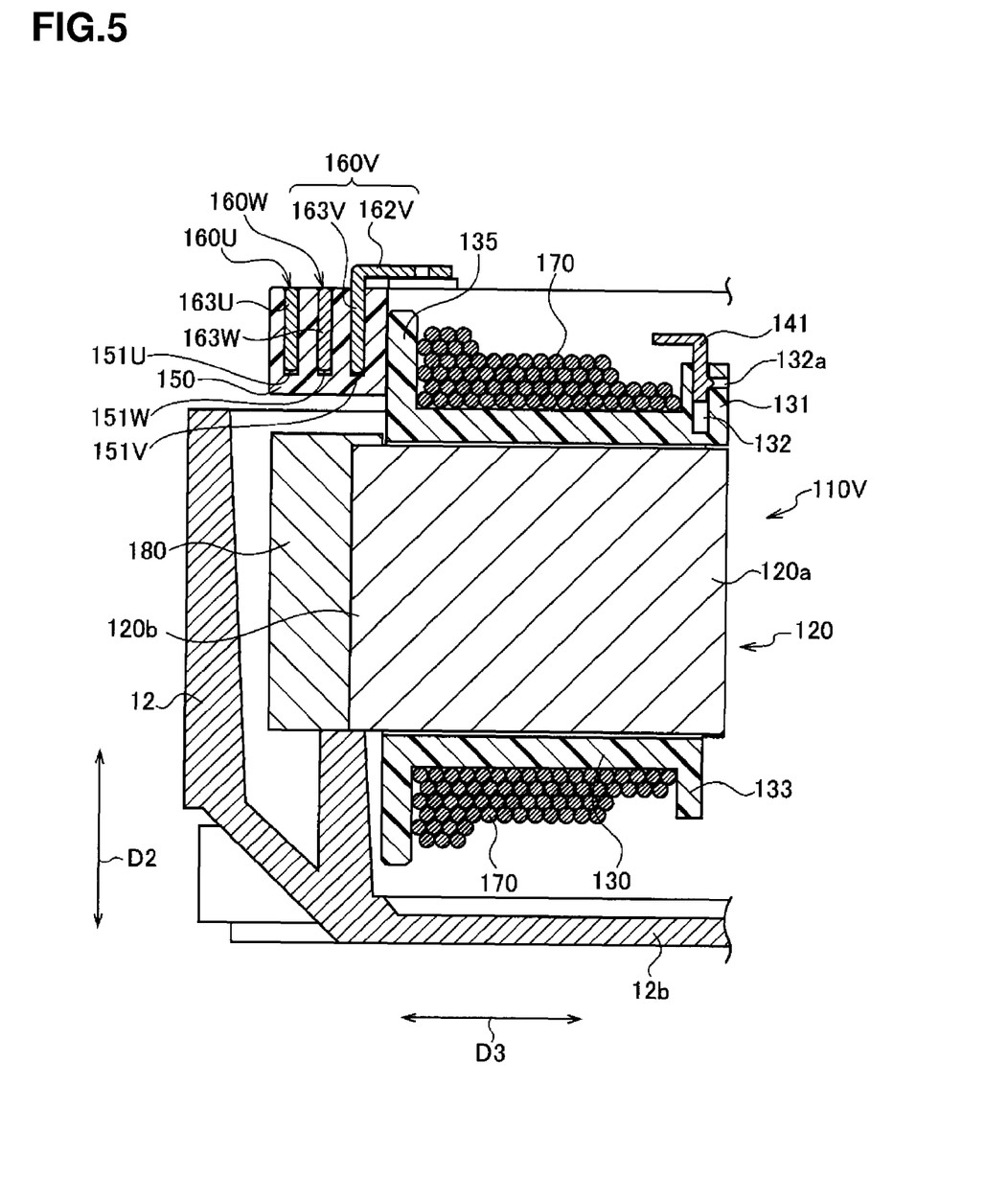
FIG. 5 is a schematic cross-sectional view of the case main body, a stator and the like according to the embodiment.

FIG. 5 is a schematic cross-sectional view of case main body 12, stator 100 and the like.

As shown in FIG. 5, inner end part 120a of each tooth 120 is exposed to the inside of the motor in the radial direction, and outer end part 120b of each tooth 120 is connected to corresponding yoke 180. Yoke 180 is fixed to case main body 12. Each tooth 120 and each yoke 180 are made of a metal, and constitute a motor core that is a skeleton of stator 100.

Each insulator 130 includes: inner flange 131 formed at the inner side of wound wire 170 in the radial direction D3; and outer flange 135 formed at the outer side of wound wire 170 in the radial direction D3. Inner flange 131 and outer flange 135 extend in the axial direction D2.

End part 131a of inner flange 131, which is close to bottom part 12b of case main body 12, is located at the outer side of inner end part 120a of tooth 120 in the radial direction D3, thereby forming a step in inner end part 120a of tooth 120 and end part 131a of inner flange 131.

Groove 132 extending in the axial direction D2 is formed in the opposite side of inner flange 131 from end part 131a. Groove 132 has opening part 132a which is open to the inside in the radial direction D3. Opening part 132a is formed so as to extend in the radial direction D3.

Bus ring holder 150 is arranged in a side of outer flange 135, which faces outward in the radial direction D3, so as to be contiguous to outer flange 135. In FIG. 5, bus ring holder 150 comes in contact with each outer flange 135.

Bus ring holder 150 is arranged along yoke 180 being contiguous to yoke 180 or with a specific gap interposed therebetween in the axial direction D2. To further decrease the size of the motor in the axial direction D2, it is desirable that bus ring holder 150 be in close contact with yoke 180. In addition, the location of the outer end of bus ring holder 150 is close to the outer end of yoke 180 in the radial direction D3.

Bus ring holder 150 is arranged in a space (dead space) between outer flange 135 and yoke 180. Specifically, because yoke 180 is shorter than outer flange 135 in the axial direction D2, the dead space is made between outer flange 135 and yoke 180. The embodiment thus effectively employs the dead space.

(3) Detailed Configurations of Bus Ring Holder and Insulator

Referring to FIG. 5, descriptions are provided for detailed configurations of bus ring holder 150. The cross-section of bus ring holder 150 is essentially shaped like a rectangle. Holding grooves 151U, 151V, 151W are formed in the surface of bus ring holder 150 opposite from yoke 180.

Holing grooves 151U, 151V, 151W are open in the directions which coincide with the axial direction D2, and are formed having specific intervals therebetween in the radial direction. Bus rings 160U, 160V, 160W include inserted parts 163U, 163V, 163W configured to be inserted in holding grooves 151U, 151V, 151W, respectively. The thickness direction of each of inserted part 163U, 163V, 163W coincides with the radial direction D3. Each of wound-wire connecting terminals 162U, 162V, 162W extends inward in the radial direction D3 from each of inserted parts 163U, 163V, 163W.

Figure 6:
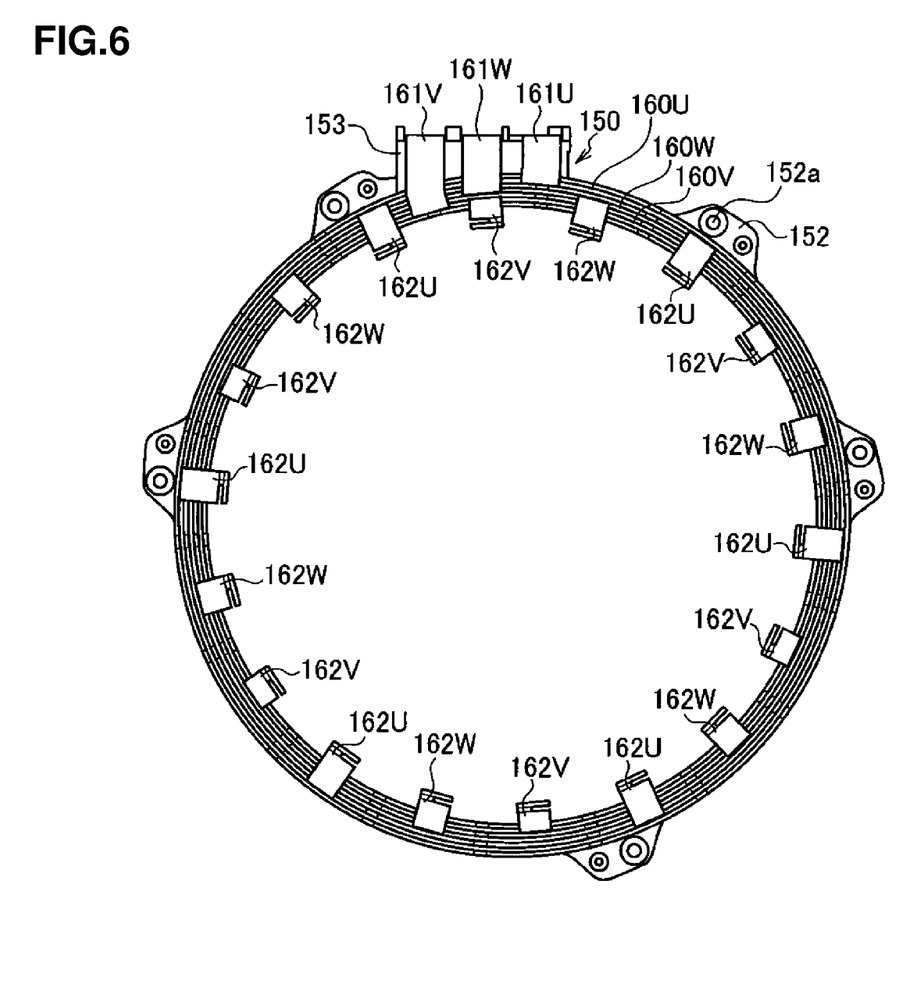
FIG. 6 is a plan view of a bus ring holder and bus rings according to the embodiment.

FIG. 6 is a plan view of bus ring holder 150 and bus rings 160U, 160V, 160W. As shown in FIG. 6, multiple fastened parts 152 protruding outward in the radial direction are formed in the outer end of bus ring holder 150. A screw insertion hole 152a is formed in each fastened part 152. Each fastened part 152 is fastened to case main body 12 by use of a corresponding screw (not illustrated), which is inserted in screw insertion hole 152a.

Furthermore, bus ring holder 150 includes supporting part 153 which supports current supplying end parts 161U, 161V, 161W which extend outward in the radial direction from inserted parts 163U, 163V, 163W of bus rings 160U, 160V, 160W, respectively.

Figure 7:
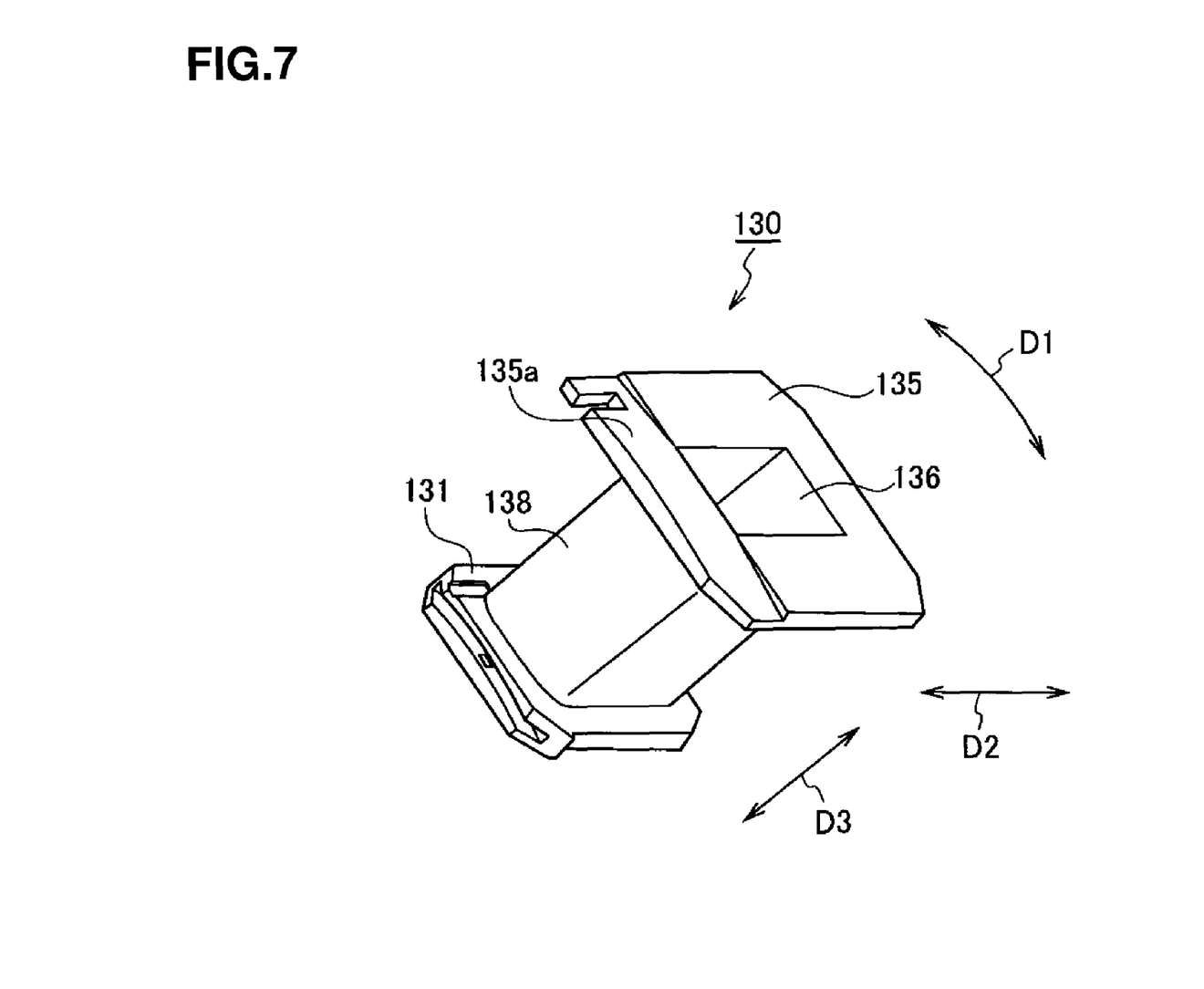
FIG. 7 is a perspective view of an insulator according to the embodiment.

FIG. 7 is a perspective view of insulator 130. As shown in FIG. 7, insulator 130 includes hollowed cylindrical part 138 which connects inner flange 131 and outer flange 135 together. In addition, insertion hole 136 in which corresponding tooth 120 is inserted is formed in insulator 130.

Outer flange 135 includes opposed surface part 135a which is opposed to the inner end of bus ring holder 150. Opposed surface part 135a curves along the ring-shaped form of bus ring holder 150. In other words, opposed surface part 135a curves in the circumferential direction D1.

(5) Method of How Teeth and Yoke are Assembled Together

Figure 8:
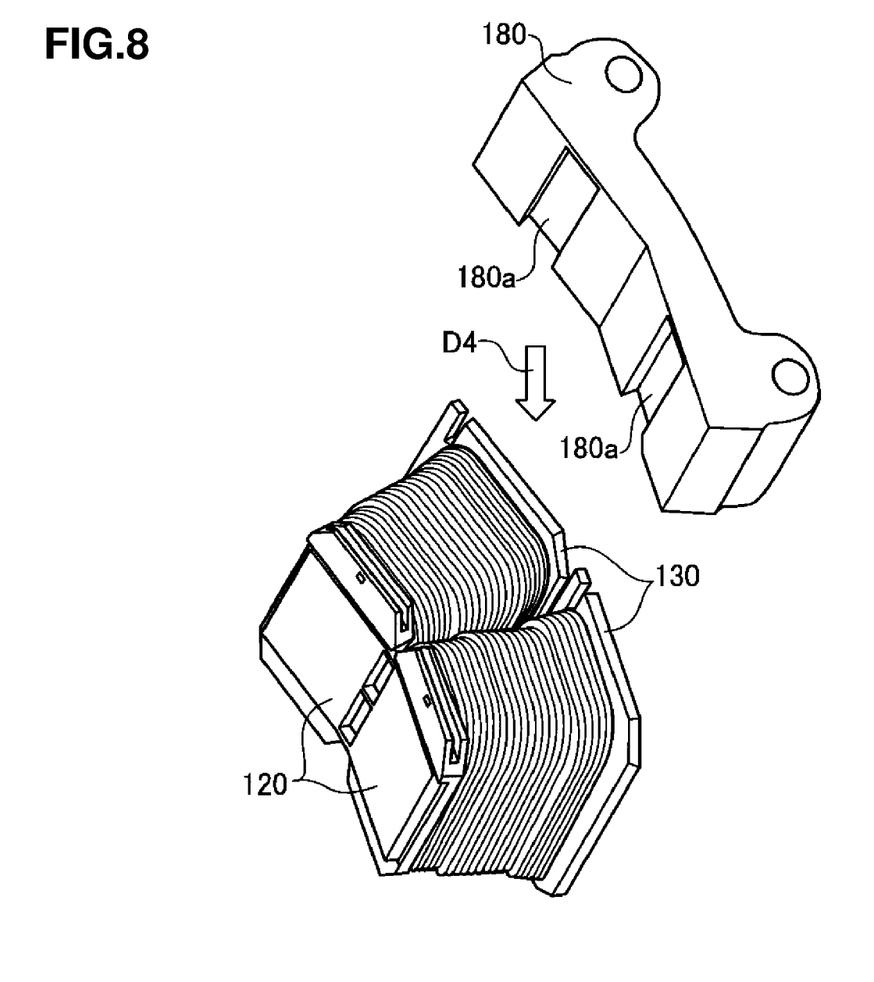
FIG. 8 is a diagram used to explain the method of how teeth and a yoke according to the embodiment are assembled together. (Part 1)
Figure 9:
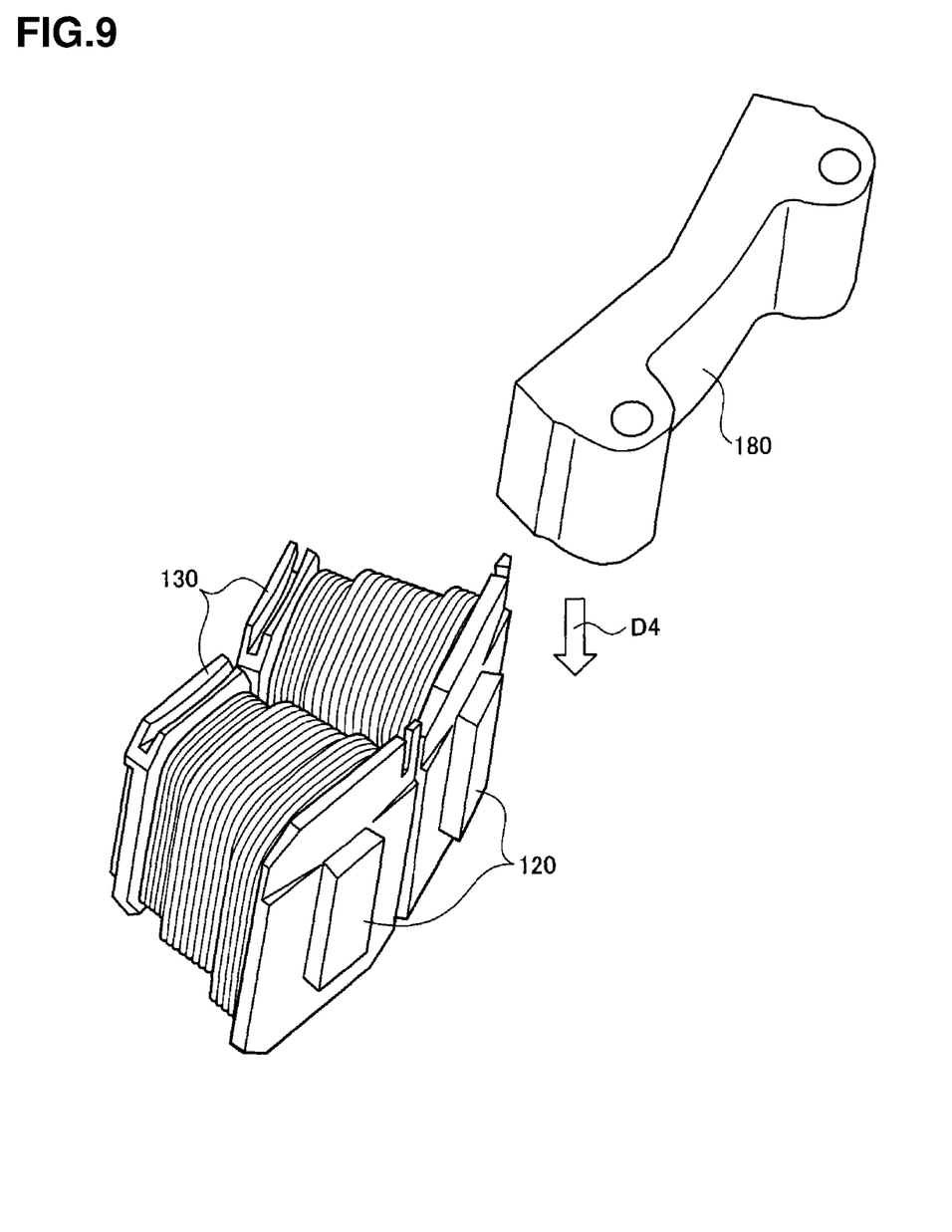
FIG. 9 is a diagram used to explain the method of how the teeth and the yoke according to the embodiment are assembled together. (Part 2)
Figure 10:
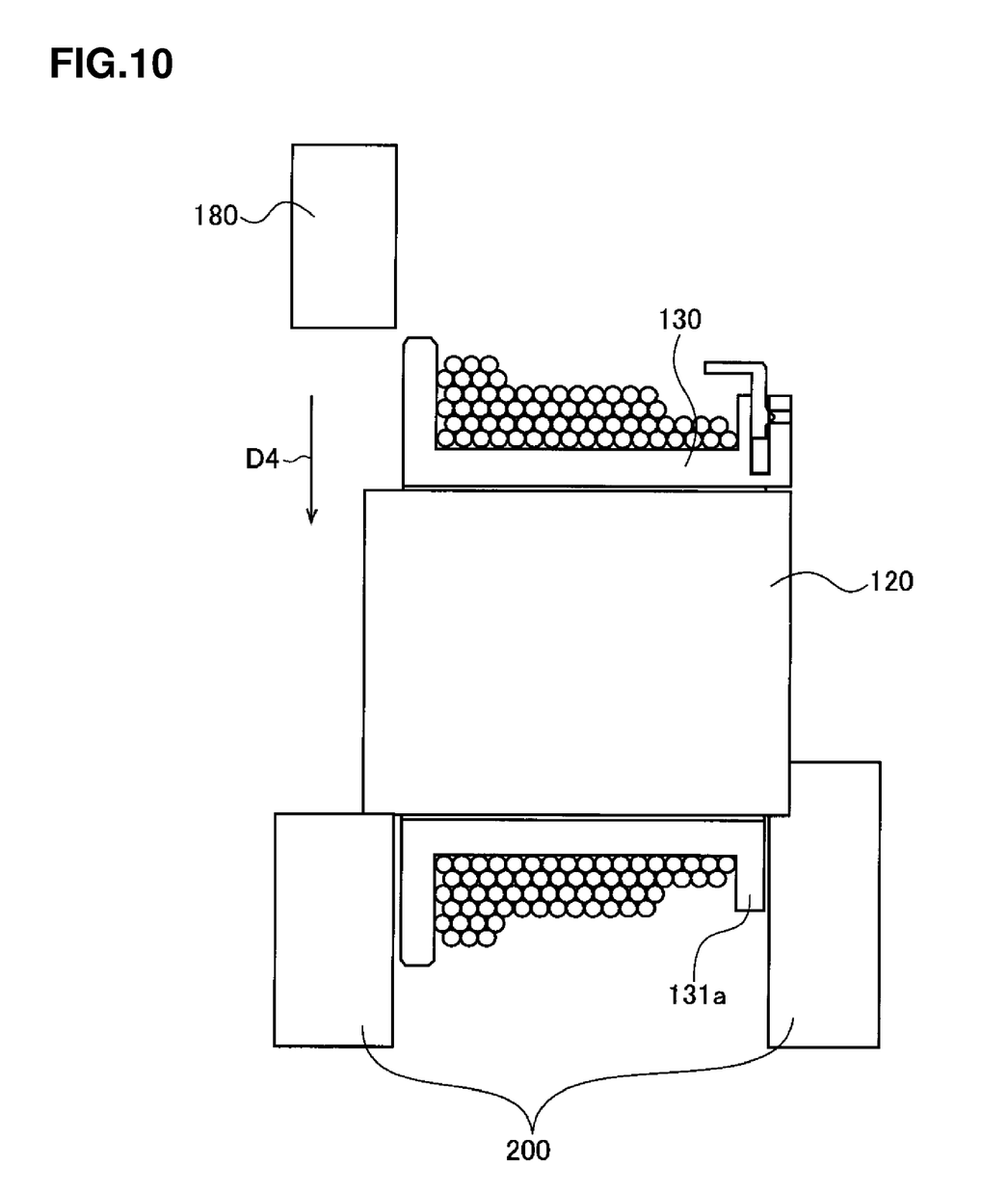
FIG. 10 is a diagram used to explain the method of how the teeth and the yoke according to the embodiment are assembled together. (Part 3)

FIGS. 8 to 10 are diagrams illustrating how teeth 120 and yoke 180 are assembled together. As shown in FIG. 8, yoke 180 is press-fit to teeth 120 with teeth 120 being respectively inserted in insulators 130. Grooves 180a are formed in yoke 180.

As shown in FIG. 9, grooves 180a formed in yoke 180 are press-fit to end portions of teeth 120, respectively. The cross-section of the end portion of each tooth 120 is shaped like a trapezoid.

As shown in FIG. 10, yoke 180 is fitted to teeth 120 in a press-fitting direction D4 with teeth 120 being fixed to jig 200. At this time steps are formed by end parts 131a of insulators 130 (inner flange 131) in the press-fitting direction D4 and end portions of teeth 120, respectively. This makes it possible for jig 200 to fix teeth 120 thereto securely.

(5) Operation and Effects

In three-brushless motor 10, as described above, bus ring holder 150 is arranged at the outer side of each outer flange 135 in the radial direction, and contiguous to each outer flange 135. This arrangement makes three-phase brushless motor 10 smaller in size in the axial direction D2 than a three-phase brushless motor which has bus ring holder 150 arranged adjacent to motor coils 110U, 110V, 110W in the axial direction D2. In addition, this arrangement makes three-phase brushless motor 10 smaller in size in the radial direction D3 than a three-phase brushless motor which has bus ring holder 150 arranged at the outer side of the motor cores in the radial direction.

In the embodiment, opposed surface part 135a of each outer flange 135, which is opposed to bus ring holder 150, curves along the ring-shaped form of bus ring holder 150. Accordingly, bus ring holder 150 can be reduced in size in the radial direction while avoiding interference with each outer flange 135. Consequently, three-phase brushless motor 10 is further reduced in size in the radial direction D3.

In the embodiment, bus ring holder 150 is arranged adjacent to each yoke 180 in the axial direction. This arrangement reduces the size of three-phase brushless motor 10 in the axial direction D2 while avoiding interference between each yoke 180 and bus ring holder 150.

In the embodiment, end part 131a of each inner flange 131 is located at the outer side of inner end part 120a of each of corresponding teeth 120 in the radial direction. The result is a step in part 131a of each insulator 130 in the press-fitting direction D4 and inner end part 120a of corresponding tooth 120. Accordingly, the embodiment jig 200 securely fixes each tooth 120 thereto.

In the embodiment, cutout part 162a configured to hold end part 171 of corresponding wound wire 170 is formed in each of wound-wire connecting terminals 162U, 162V, 162W. This stabilizes wound wires 170 in the process of connecting wound wires 170 to corresponding wound-wire connecting terminals 142U, 142V, 142W, thereby making it easier to connect wound wires 170 to wound-wire connecting terminals 142U, 142V, 142W. In addition, this also achieves an increase in the strength of connection between wound wires 170 and corresponding wound-wire connecting terminals 162U, 162V, 162W.

In the embodiment, each of plate-shaped wound-wire connecting terminals 162U, 162V, 162W has, in its surface, concave part 162b, which is in contact with end part 171 of corresponding wire 170. Thus, wound wires 170 can be soldered to corresponding wound-wire connecting terminals 162U, 162V, 162W with their contact areas being increased, thereby further increasing the strength of the connection between wound wires 170 and corresponding wound-wire connecting terminals 162U, 162V, 162W. Furthermore, wound wires 170 can be soldered to corresponding wound-wire connecting terminals 162U, 162V, 162W while positioned by their cutout parts 162a and concave parts 162b, thereby making it easier to connect wound wires 170 to wound-wire connecting terminals 162U, 162V, 162W.

In the embodiment, cutout part 162a is formed in the end portion of each of wound-wire connecting terminals 162U, 162V, 162W, the end portion located at the end in the direction D5 in which end part 171 of corresponding wound wire 170 extends from corresponding insulator 130. Accordingly, wound wires 170 is less likely to get loose while being soldered to corresponding wound-wire connecting terminals 162U, 162V, 162W.

(6) Other Embodiments

The foregoing descriptions have been provided for the invention on the basis of the embodiment. However, the descriptions and drawings constituting part of this disclosure shall not be construed as limiting this invention. From this disclosure, various alternative embodiments, examples and operational techniques are clear to those skilled in the art.

Figure 11:
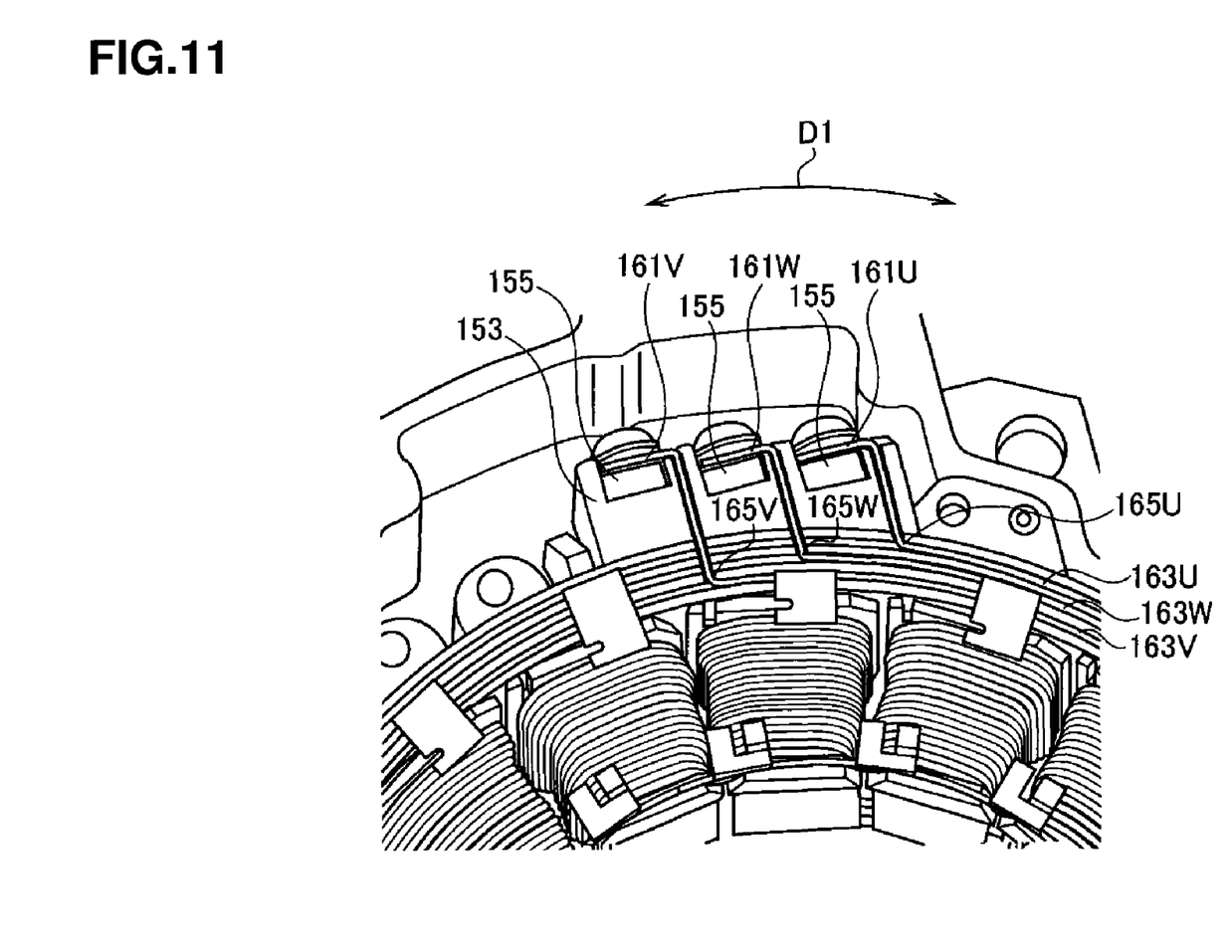
FIG. 11 is a perspective view showing a configuration of a current supplying end part according to another embodiment.

In the embodiment, connecting portions between current supplying end parts 161U, 161V, 161W and inserted parts 163U, 163V, 163W are folded along the folding line extending in the circumferential direction D1. This configuration requires current supplying end parts 161U, 161V, 161W to be made by punching a metal sheet in the form of a letter L, and accordingly wastes part of the metal sheet. However, this waste of the metal sheet can be avoided by folding the connecting portions 165U, 165V, 165W between current supplying end parts 161U, 161V, 161W and inserted parts 163U, 163V, 163W along the a folding line extending in the axial direction D2 as shown in FIG. 11. In FIG. 11, nuts 155 are embedded in supporting parts 153 of bus ring holder 150.

Figure 12:
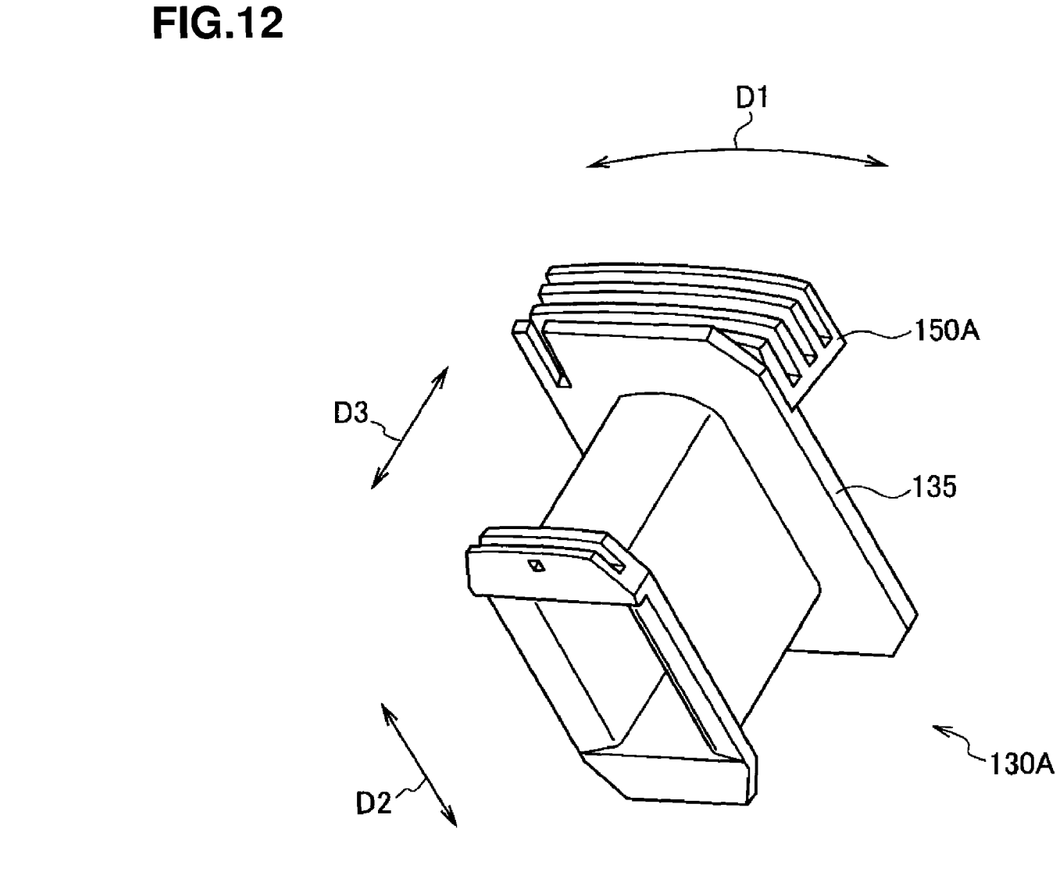
FIG. 12 is a perspective view of a bus ring holder and an insulator according to yet another embodiment.

Moreover, in the above-described embodiment, insulator 130 and bus ring holder 150 are formed as members separated from each other. However, as shown in FIG. 12, insulator 130A and bus ring holder 150A may be formed as a single component. Even in this configuration, bus ring holder 150A is arranged at the outer side of outer flange 135 of insulator 130A in the radial direction, and contiguous to outer flange 135.

In the above-described embodiment, wound wires 170 are soldered to wound-wire connecting terminals 142U, 142V, 142W and to wound-wire connecting terminals 162U, 162V, 162W. However, the soldering may be replaced with welding.

Furthermore, in the above-described embodiment, each yoke 180 and corresponding teeth 120 are formed as members separated from one another. However, each yoke 180 and corresponding teeth 120 may be formed as a single component.

In the foregoing descriptions, three-phase brushless motor 10 is described to be mounted on a motor vehicle. However, three-phase brushless motor 10 may be mounted not only on a motor vehicle, but also on an electric appliance or the like.

As described above, according to the embodiments, the motor can be reduced in size in the axial and the radial directions while being configured by including the ring-shaped bus ring holder configured to hold the bus rings.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A motor comprising:
   a stator including a plurality of motor coils;
   a plurality of bus rings configured to distribute currents of
      a plurality of different phases to the motor coils; and a ring-shaped bus ring holder in which a plurality of holding grooves configured to hold the respective bus rings are formed, wherein each of the motor coils includes an insulator around which a wound wire is wound, the insulator includes an outer flange formed at an outer side of the wound wire in a radial direction of the motor and extending in an axial direction of the motor, and the bus ring holder is arranged at an outer side of the outer flange in the radial direction of the motor, and contiguous to the outer flange.

2. The motor of claim 1, wherein the outer flange has a surface part opposed to the bus ring holder, and the opposed surface part curves along a ring-shaped form of the bus ring holder.

3. The motor of claim 1, further comprising:

teeth each extending in the radial direction of the motor and inserted into one of the insulators; and a yoke arranged at an outer side of the insulators in the radial direction of the motor and connected to a first end part of each of the teeth, wherein the bus ring holder is arranged contiguous to the yoke in the axial direction of the motor.

4. The motor of claim 3, wherein the insulator includes an inner flange at an inner side of the wound wire in the radial direction of the motor, the yoke is press-fit to the teeth, and an end part of the inner flange in a press-fitting direction in which the yoke is press-fit to the teeth is located at an outer side of a second end part of a corresponding tooth in the radial direction of the motor.

5. The motor of claim 1, wherein each bus ring comprises:

an inserted part inserted into a corresponding holding groove; and a wound-wire connecting terminal extending inward from the inserted part in the radial direction of the motor, and connected to an end part of the wound wire, and the wound-wire connecting terminal includes a cutout part that holds the end part of the wound wire.

6. The motor of claim 5, wherein the wound-wire connecting terminal is shaped like a plate, the end part of the wound wire is connected to a surface of the wound-wire connecting terminal, and the wound-wire connecting terminal has a concave part on the surface in a portion where the surface contacts the end part of the wound wire.

7. The motor of claim 5, wherein the end part of the wound wire extends from the insulator toward the wound-wire connecting terminal, and the cutout part is formed in an end portion of the wound-wire connecting terminal in a direction in which the end part of the wound wire extends.

8. The motor of claim 1, wherein each of the bus rings comprises:

a ring-shaped part formed in a circumferential direction of the motor;

a current supplying end part positioned at an outer side of the ring-shaped part in the radial direction of the motor and configured to supply one of the currents of different phases; and a folded part continuing to the current supplying end part and the ring-shaped part, and folded along an axial direction of the motor.

9. The motor of claim 1, wherein the bus ring holder and the insulators are a single unit.

* * * * *